United States Patent [19]

Gaewsky

[11] Patent Number: 4,972,217
[45] Date of Patent: Nov. 20, 1990

[54] SHUTTER MECHANISM DRIVE HAVING REDUCED MECHANICAL NOISE

[75] Inventor: John P. Gaewsky, Reading, Mass.
[73] Assignee: Polaroid Corporation, Cambridge, Mass.
[21] Appl. No.: 428,055
[22] Filed: Oct. 27, 1989
[51] Int. Cl.$^5$ .................. G03B 7/097; G03B 9/14
[52] U.S. Cl. .................. 354/235.1; 354/247; 354/437
[58] Field of Search .................. 354/234.1, 235.1, 247, 354/437, 436

[56] References Cited

U.S. PATENT DOCUMENTS

| | | | |
|---|---|---|---|
| 3,415,644 | 12/1968 | Land | 96/3 |
| 3,672,281 | 6/1972 | Land | 95/42 |
| 3,753,392 | 8/1973 | Land | 95/13 |
| 3,942,183 | 3/1976 | Whiteside | 354/29 |

Primary Examiner—Michael L. Gellner
Attorney, Agent, or Firm—John J. Kelleher

[57] ABSTRACT

A shutter mechanism actuated by a plunger type solenoid in an exposure control system for a reflex camera is provided with a solenoid drive control for reducing the subject-distracting mechanical noise that is normally generated when the solenoid plunger is driven into its fully retracted position in order to close shutter blades forming a portion of the shutter mechanism, immediately prior to an exposure interval. The solenoid drive control comprises a microcontroller and a blade encoder to indicate the degree of blade closure. Blade closure signals are routed to the microcontroller that, in response thereto, causes a reduction in the amount of solenoid actuating current delivered to the solenoid to thereby reduce the amount of solenoid drive and therefore the amount of mechanical noise that is generated when the solenoid plunger is driven into the fully retracted position.

8 Claims, 4 Drawing Sheets

SHUTTER MECHANISM DRIVE HAVING REDUCED MECHANICAL NOISE

BACKGROUND OF THE INVENTION

1. Field of the Invention

The present invention relates to exposure control systems for photographic apparatus, in general, and to the control of the shutter blades in an exposure control system of a single lens reflex camera, in particular.

2. Description of the Prior Art

Photographic cameras of the reflex type have been developed wherein the exposure of photosensitive material within the camera is both automatically and electronically controlled. Such cameras are often of the single lens reflex variety and require a complex exposure control system in order to accommodate a requisite viewing and focusing mode. During this mode of operation the single lens reflex camera is in a normally open status wherein a shutter mechanism that forms a portion of the exposure control system allows or unblocks the passage of scene light through an exposure opening or taking lens to a viewfinder.

At the commencement of an exposure cycle, the shutter mechanism of the camera exposure control system is driven into a closed or light blocking orientation whereupon the photographic camera is automatically operated to change from the viewing or viewing and focusing mode to an exposure mode in which photosensitive film is made accessible to the optical path of the taking lens of the camera.

In one type of single lens reflex camera employing a shutter mechanism of the "scanning" blade type, such as that described in U.S. Pat. No. 3,672,281 to E. H. Land, when the camera has assumed the exposure mode of operation, the exposure control system operates to release a shutter mechanism from its light blocking orientation where such exposure control parameters as exposure interval and aperture size are controlled as a function of scene brightness as evaluated with respect to the sensitometric characteristics of the film being exposed. At the termination of the electronically determined exposure interval, the shutter is again driven to a fully closed or light blocking position to terminate exposure until such time as the camera reassumes the viewing or viewing and focusing mode.

The actuation of the exposure control system to drive the shutter mechanism from its light unblocking orientation to its light blocking orientation at the commencement of an exposure cycle and prior to an exposure interval produces a considerable amount of mechanical noise that is often distracting to the subject being photographed. A subject within a scene hearing the mechanical noise generated by the shutter mechanism at this point in the exposure cycle will often incorrectly conclude that this particular noise indicates that exposure is complete and start moving during the subsequent exposure, thereby causing a blurred image to result.

An example of an exposure control system operated in this manner is described in U.S. Pat. No. 3,942,183 to Whiteside. In this Whiteside patent a pair of overlapping "scanning" type shutter blade elements are supported within a camera housing in a light path between a taking or objective lens and photosensitive film located at the camera's focal plane. A pair of scene light admitting primary apertures are respectively provided in the blade elements to collectively define a progressive variation of effective aperture openings in accordance with longitudinal and lateral displacement of one blade element with respect to the other blade element.

A tractive electromagnetic device in the form of a plunger-type solenoid is employed to displace the shutter blades with respect to each other. The solenoid is of conventional design having an internally disposed cylindrical plunger unit which retracts inwardly into the body of the solenoid upon energization thereof. The solenoid plunger is suitably coupled to each shutter blade element such that, upon energization, the solenoid actuates the shutter mechanism to its fully closed position. A subject distracting mechanical noise is generated when the solenoid plunger is retracted into its seated position within the solenoid body by the solenoid drive system.

SUMMARY OF THE INVENTION

It is a primary object of the present invention, therefore, to provide a shutter mechanism for a reflex camera that will provide a minimum of distraction to a subject being photographed when actuated to its fully closed position.

It is another object of the present invention to provide a shutter drive for a reflex camera that will produce a minimum amount of mechanical noise when a shutter mechanism coupled thereto is actuated to its fully closed position.

It is a further object of the present invention to provide a plunger-type solenoid for driving a shutter mechanism that will produce a minimum amount of mechanical noise when the plunger is actuated to its fully retracted position.

Other objects, features and/or advantages of the present invention will be readily apparent from the following detailed description of a preferred embodiment thereof when taken in conjunction with the accompanying drawings.

In accordance with a preferred embodiment of the present invention a solenoid drive control for use with a plunger-type solenoid in an exposure control system of a reflex camera is provided, that substantially reduces the level of subject-distracting mechanical noise that is normally generated when the plunger of the solenoid is driven into its seated position in order to place scene light controlling shutter blades coupled thereto in their fully closed position, immediately prior to an exposure interval. Means are provided for sensing the degree of shutter blade closure and for reducing the amount of drive generated by the solenoid when the solenoid plunger and shutter blades coupled thereto are driven into their seated or fully closed positions, respectively.

DETAILED DESCRIPTION OF THE PREFERRED EMBODIMENT

Figure 1:
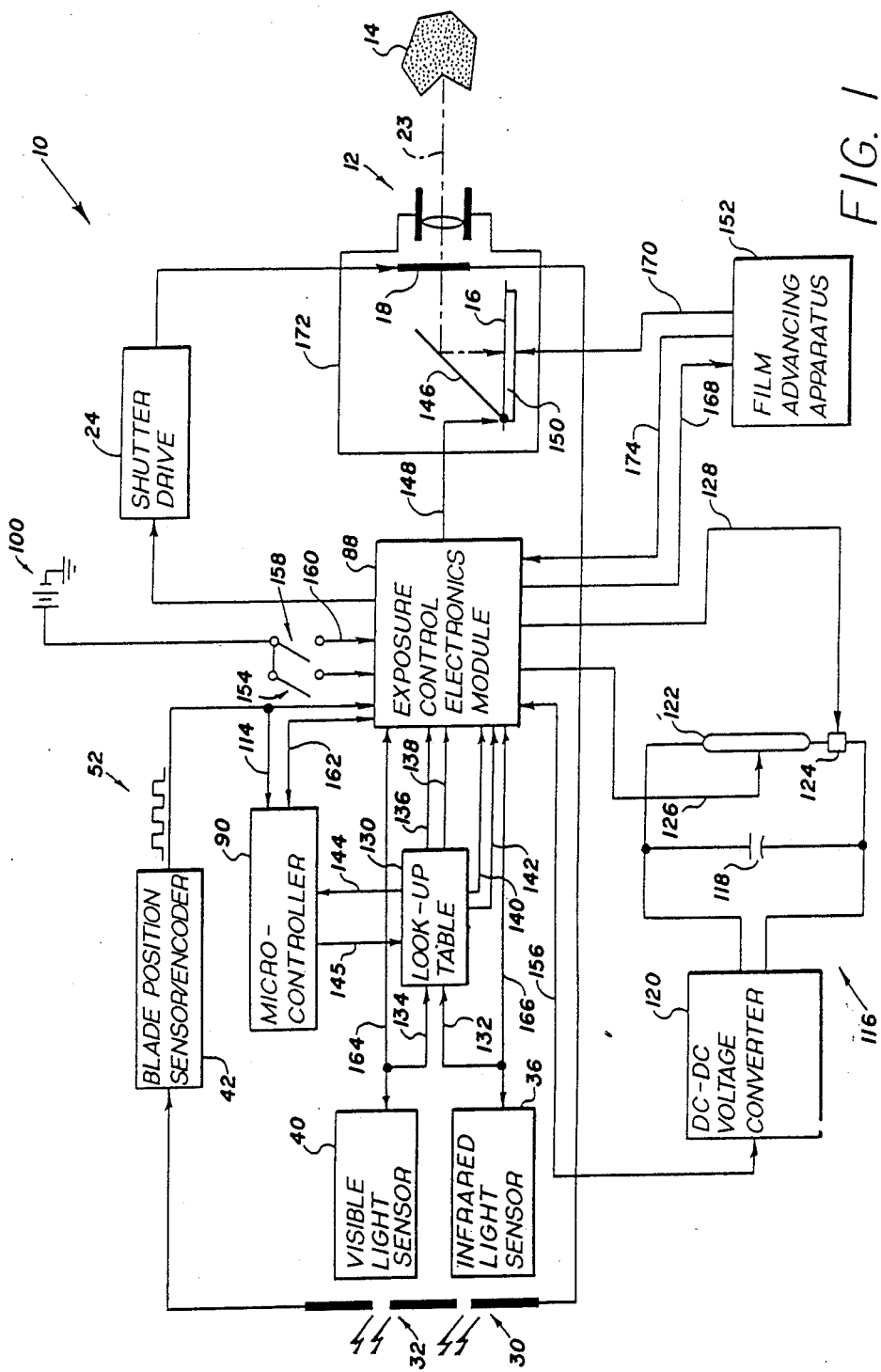
FIG. 1 is a schematic diagram of a photographic camera which incorporates a preferred embodiment of the quiet, shutter blade mechanism solenoid drive of the present invention.

Referring now to the drawings, and specifically to FIG. 1, there is shown a single lens reflex (SLR) photographic camera 10 of the self-developing type which incorporates a preferred embodiment of a mechanical noise reducing drive control system for a shutter blade actuating, plunger-type solenoid of the present invention. The camera 10 includes an objective or taking lens 12, of the fixed focus type, that may include one or more elements (only one shown) for focusing imagecarrying light rays of, for example, an object 14 on a film plane 16 through an aperture formed in a shutter blade mechanism or assembly 18.

Figure 2A:
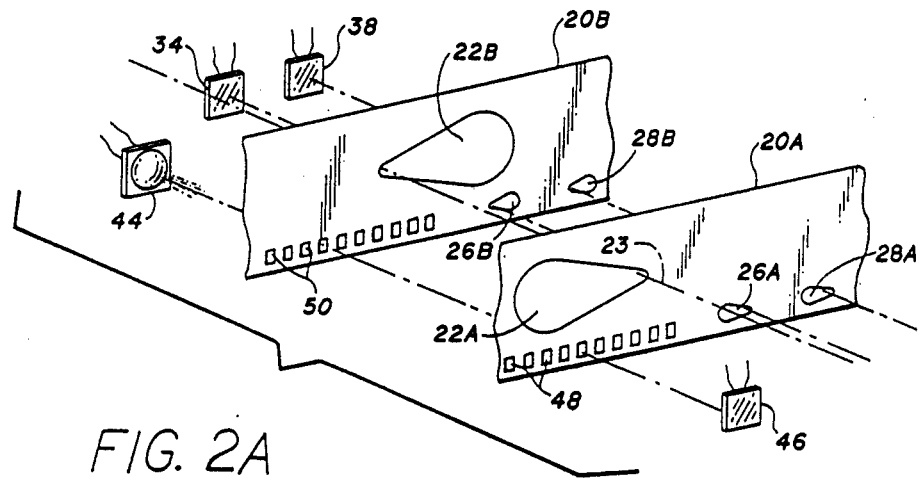
FIG. 2A is an exploded perspective view of a portion of the scanning type shutter blade mechanism schematically shown in FIG. 1.
Figure 2B:
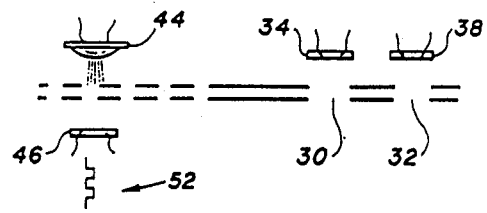
FIG. 2B is an unexploded top view, partly in section, of the shutter blade mechanism of FIG. 2A.
Figure 5:
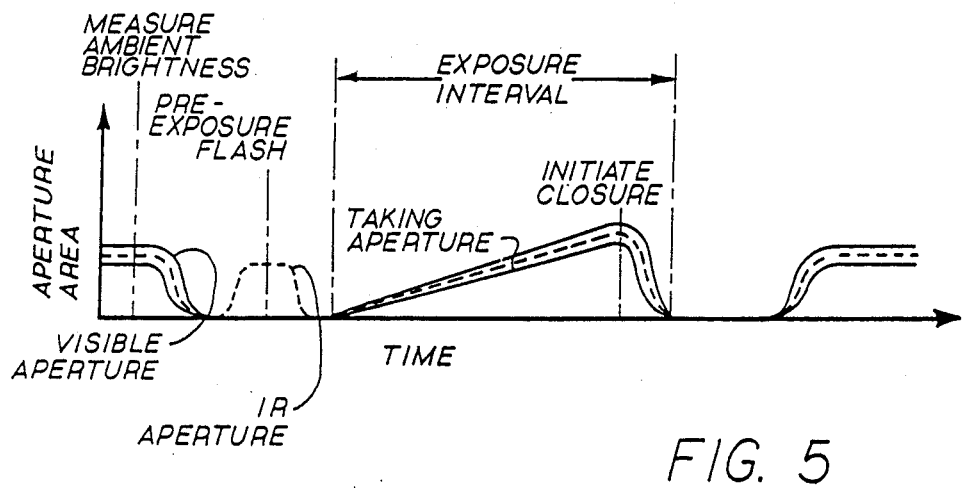
FIG. 5 is a graph showing primary and secondary blade aperture size variations as a function of time, during an exposure cycle.

With additional reference to FIGS. 2A and 2B of the drawings, shutter blade mechanism 18, positioned intermediate of the lens 12 and the film plane 16, includes a pair of overlapping shutter blade elements 20A and 20B of the "scanning" type. Scene light admitting primary apertures 22A and 22B, are respectively provided in the shutter blade elements 20A and 20B to cooperatively define a progressive and predictable variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures 22A and 22B are selectively shaped so as to overlap the central optical axis 23 of the lens 12 thereby defining a gradually varying effective aperture size as a function of the position of the blade elements 20A and 20B of the blade mechanism 18. A shutter drive 24 is provided for displacing the blade elements 20A and 20B of the blade mechanism 18 in the above-described manner. The shutter drive 24 includes a tractive electromagnetic device in the form of a plunger-type solenoid and a control system therefor for displacing the above-mentioned shutter blade elements. This plunger-type solenoid and its associated control system will be described below in detail.

Each of the blade elements 20A and 20B of the blade mechanism 18 includes two secondary apertures 26A, 28A and 26B and 28B, respectively. The aperture 26A in the blade 20A cooperates with the aperture 26B in the blade 20B to form an opening 30 and the aperture 28A in blade 20A cooperates with the aperture 28B in blade 20B to form an opening 32 through the shutter assembly 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination infrared photosensitive element 34 and integrator (not shown) within an infrared light sensor 36 that senses and integrates a corresponding amount of infrared scene light through the opening 30. The amount of visible light admitted to the film plane 16 through these primary apertures is controlled by a signal generated by a combination visible light photosensor 38 and integrator (not shown) within a visible light sensor 40 that senses and integrates a corresponding amount of ambient light, through the opening 32. An example of scanning blade elements having primary and secondary apertures that cooperate to control the amount of scene light admitted to a film plane is shown in U.S. Pat. No. 3,942,183, supra.

The camera 10 is provided with a blade position sensor/encoder 42. The sensor/encoder 42 senses the position of the blade elements 20A and 20B with respect to one another and generates a signal representative of the relative blade element position. The sensor/encoder 42 comprises a light emitting diode 44, a photosensor 46 spaced therefrom, and a plurality of slots or openings 48 and 50 formed in the blade elements 20A and 20B, respectively. The slots 48 and 50 are rectangular in shape, are of uniform size and are equally spaced in a linear direction in their respective blade elements. The slots 48 and 50 are collectively interposed between the light emitting diode 44 and the photosensor 46 such that they alternately block and unblock the transmission of light between these two components to thereby cause the photosensor 46 to generate one or more pulses 52 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulse or pulses 52 is also a measure of the size of the effective or taking aperture formed by the primary apertures 22A and 22B. In addition and as noted above, the blade elements 20A and 20B are actuated between their opened and closed positions by a plunger-type solenoid to be described below with respect to drawing FIG. 3A and 3B.

Figure 3A:
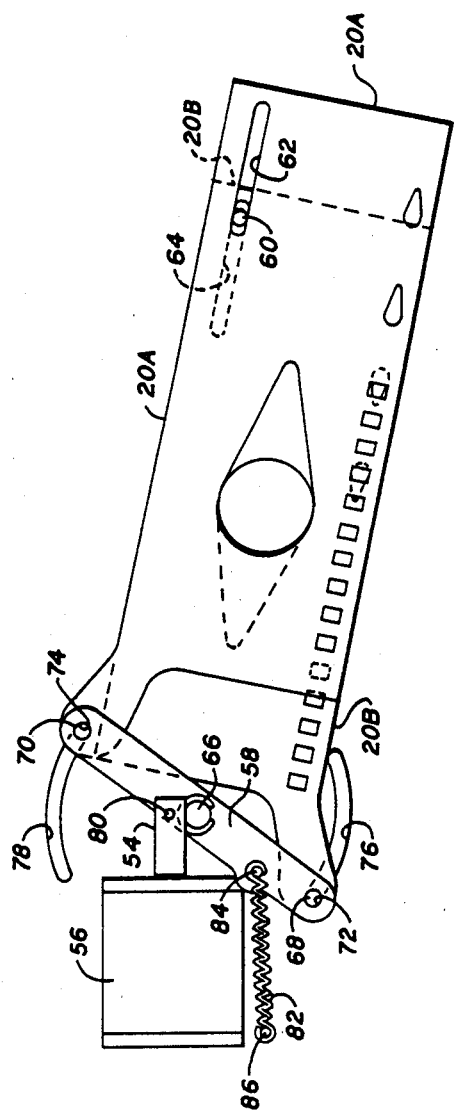
FIG. 3A is an elevation view of the shutter mechanism of the present invention showing the shutter blade elements thereof in their fully open positions.
Figure 3B:
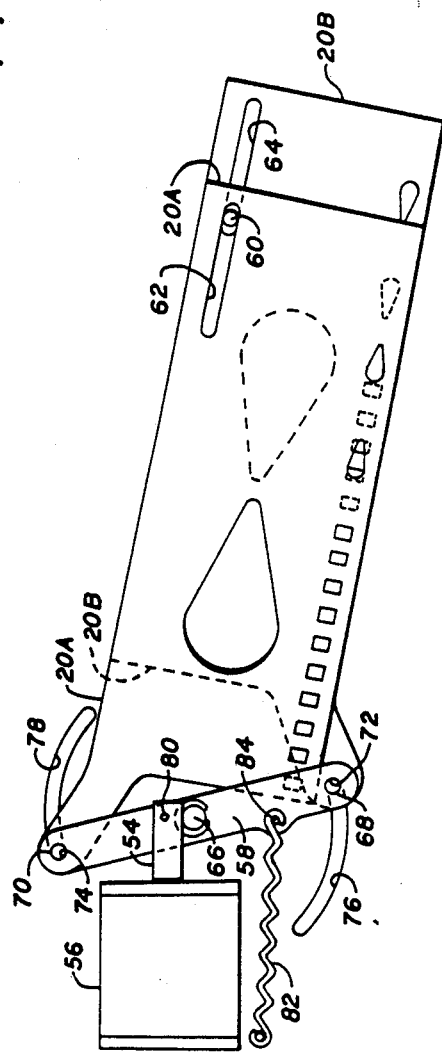
FIG. 3B is an elevational view of the shutter mechanism of the present invention showing the shutter blade elements thereof in their fully closed positions.

As shown in FIG. 3A and 3B, a movable member or plunger 54 of an electrical solenoid 56 is mechanically coupled to each of the blade elements 20A and 20B. Therefore, the pulse or pulses 52 generated by blade position sensor/encoder 42 during blade element 20A and 20B movement is also a measure of the position of the plunger 54 of the electrical solenoid 56. The size of the slots 48 and 50 in respective blade elements 20A and 20B is kept to a minimum, in the direction of blade element movement, in order to minimize any shutter blade or solenoid plunger position errors between their actual positions and the signal or pulses 52 representative of such positions.

With additional reference to FIGS. 3A and 3B of the drawings there is shown therein the plunger-type solenoid 56 with its movable plunger 54 mechanically coupled to the blade elements 20A and 20B through a walking beam 58. FIG. 3A shows the blade elements 20A and 20B in their fully opened or light unblocking positions and FIG. 3B shows these blade elements in their fully closed or light blocking positions. Projecting from a camera support member or casting (not shown) at a location laterally spaced from the opening formed by the primary apertures 22A and 22B is a pivot pin or stud 60 which pivotally and translatively engages elongated slots 62 and 64 formed in shutter blade elements 20A and 20B, respectively. The opposite ends of the blade elements 20A and 20B respectively include extended portions which pivotally connect to the walking beam 58. The walking beam 58, in turn, is disposed for rotation about a pivot pin or stud 66 that is supported by a camera support member (not shown) at a location that is also laterally spaced from the opening formed by the primary apertures 22A and 22B. The walking beam 58 is pivotally connected at its distal ends to the shutter blade elements 20A and 20B by respective pin members 68 and 70 which extend from the walking beam 58. Pin members 68 and 70 are preferably circular in cross section and extend through respective circular openings 72 and 74 in respective blade elements 20A and 20B so as to slidably engage respective arcuate slots or tracks 76 and 78 formed in a housing support member (not shown). The arcuate tracks 76 and 78 operate to prohibit disengagement of the blade members 20A and 20B from their respective pin members 68 and 70 during exposure control system operation.

A tractive electromagnetic device in the form of the solenoid 56 is employed to displace the shutter blades 20A and 20B with respect to each other to produce an exposure interval. The solenoid 58 is of conventional design having an internally disposed cylindrical plunger 54 which retracts inwardly into the body of the solenoid upon energization thereof. The solenoid plunger 54 is affixed to the walking beam 58 by means of a pivot pin or stud 80 such that longitudinal displacement of the plunger 54 will operate to rotate the walking beam 58 around the pivot pin 66 so as to appropriately displace the blade elements 20A and 20B.

The solenoid 56 is supported, in a fixed position, just above a bias tensioning spring 82 which operates to continuously urge the blade elements 20A and 20B into positions collectively defining their largest effective aperture, overlapping the central optical axis 23 of the lens 12. A movable end of the spring 82 is attached to the walking beam 58 by a pin 84 projecting therefrom while a stationary end is affixed to a pin 86 extending from a camera housing support member (not shown). With this particular spring connection the blade members 20A and 20B and the primary apertures 22A and 22B respectively formed therein are biased to their normally open orientation. The blade elements 20A and 20B are actuated to their closed position, as shown in FIG. 3B, only when the solenoid 56 is energized. Consequently, energization of the solenoid 56 prevents the shutter blade elements 20A and 20B from moving toward their maximum aperture opening under the urging of bias spring 82.

Figure 4:
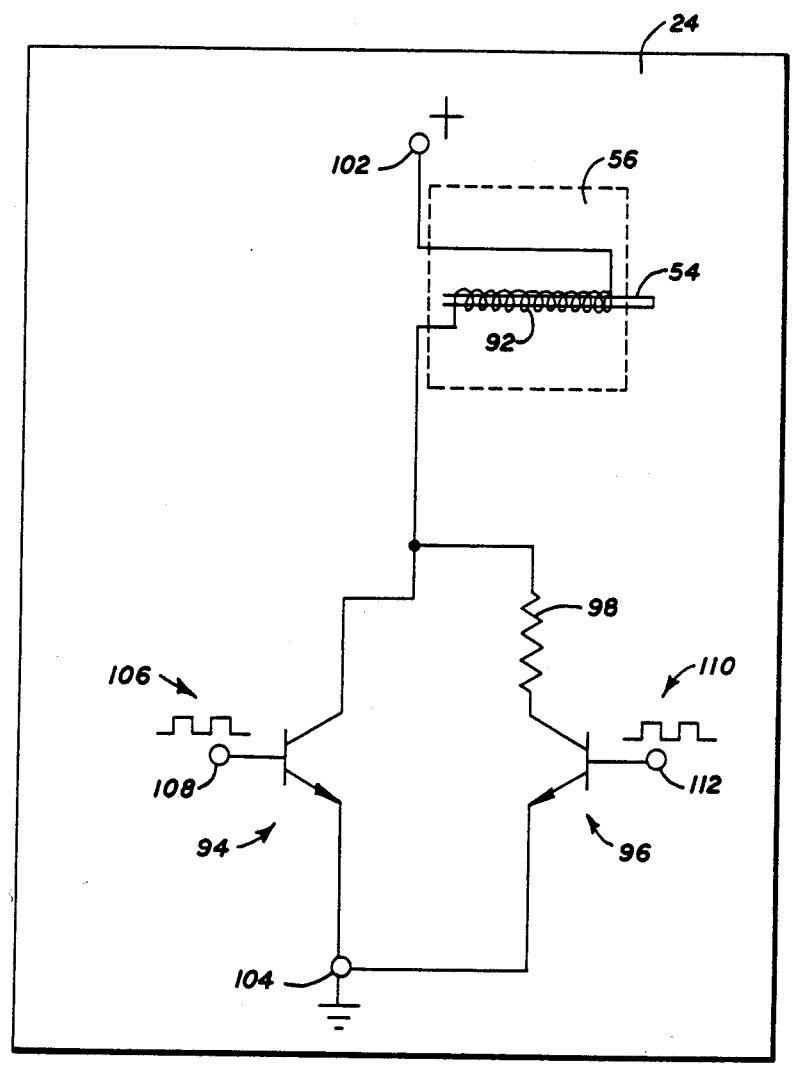
FIG. 4 is a schematic diagram of a portion of the control system for controlling the electrical actuation of the plunger-type solenoid of the present invention.

Actuation of the blade elements 20A and 20B of the shutter mechanism 18 from their fully opened to their fully closed position immediately prior to an exposure interval is controlled by the shutter drive 24, the exposure control electronics module 88, the microcontroller 90 and the blade position sensor/encoder 42. As shown in FIG. 4, the shutter drive 24 includes a system for controlling the amount of power supplied to a coil 92 of the solenoid 56 and therefore the amount of force applied to the blade elements 20A and 20B, for blade element actuation. The control system includes a pair of transistors 94 and 96 connected in a parallel relation that are in turn connected in series relation with respect to the solenoid coil 92. A current limiting resistor 98 is also connected in series with the solenoid coil 92 and the transistor 96. In addition, a battery 100 has its output connected between the terminals 102 and 104. When a series of pulses 106 are applied to a base terminal 108 of the transistor 94 the maximum output voltage of the battery 100 is periodically applied to the solenoid coil 92. Similarly, when a series of pulses 110 are applied to a base terminal 112 of the transistor 96 a reduced amount of the output voltage of the battery 100 is applied to the solenoid coil 92 and the remaining portion of this output voltage is applied to the current limiting resistor 98. When the transistor 94 is in its fully conducting state, the plunger 54 is retracted within the solenoid coil 92 with the greatest amount of attractive force whereas when the transistor 96 is in its fully conducting state, the plunger 54 is retracted within the solenoid coil 92 with a substantially reduced level of attractive force.

The blade position sensor/encoder 42 generates the series of pulses 52 representative of the degree of solenoid plunger 54 and of relative blade elements 20A and 20B movement and routes these relative position signals to the microcontroller 90 through a path 114. The microcontroller 90 preferably includes a number of conventional preset counters (not shown) that count the number of relative blade element and solenoid plunger position pulses generated by the blade position sensor/encoder 42. The solenoid drive 24 is actuated to drive the shutter mechanism 18 by means of two separate series of pulses 106 and 110 generated within the microcontroller 90 and respectively applied to the base terminals 108 and 112 of the respective transistors 94 and 96, as previously explained. At this point, a maximum and then a reduced amount of retractive force is alternately applied to the plunger 54 of the solenoid 56 by the alternate energization of the transistors 94 and 96. When one of the above-mentioned preset counters counts a first number of pulses from the blade position sensor/encoder 42, the microcontroller 90 reduces the duty cycle or the width of the pulses 106 thereby reducing the "on" time of the transistor 94. As the "on" time of the transistor 94 is reduced, the "on" time of the transistor 96 is subsequently or alternately increased by the microcontroller 90 by increasing the duty cycle or the width of the pulses 110. As each of the above-mentioned preset counters senses a number of blade position pulses 52 equal to the number of counts previously stored therein, the duty cycle of the series of pulses 106 and 110 is respectively decreased and increased in a conventional manner by the microcontroller 90 in a similar fashion. In this manner the level of the drive force being applied to the solenoid plunger 54 by the solenoid coil 92 is gradually reduced until a minimum force level is achieved. The solenoid plunger is withdrawn into its seated or fully retracted position within the solenoid coil 92 while this minimum force level is being applied thereto thereby minimizing the amount of mechanical noise that would otherwise be generated if the maximum amount of retractive force was being applied to the solenoid plunger as it so moves into its fully retracted position as in conventional arrangements. It should be noted that a reduction in solenoid plunger generated mechanical noise can also be achieved by merely pulsing the solenoid coil 92 "on" and "off" with a single transistor such as the transistor 94 whose duty cycle is then gradually reduced. However, such an arrangement is not as effective in reducing the level of solenoid plunger generated mechanical noise as the two transistor arrangement described above that applies two different levels of force to the solenoid plunger 54 during blade element movement.

The camera 10 is also provided with an electronic flash apparatus 116 together with apparatus for controlling its energization in order to determine subject reflectivity and to provide a portion of the exposure value required to illuminate a scene to be photographed. The electronic flash apparatus 116 comprises a main storage capacitor 118 which may be charged up to an operating voltage by any conventional voltage converter circuit (not shown) which would be included within a DC-DC voltage converter 120. The DC-DC voltage converter 120 operates in a conventional matter to convert a DC voltage as may be derived from the battery 100, which can be in the order of 6 volts, to a suitable operating voltage such as 280 volts. A flash tube 122 and a series connected thyristor 124 are collectively connected in a parallel relation with respect to the main storage capacitor 118. The flash tube 122 may be energized by a suitable trigger signal on a path 126 from a conventional trigger circuit (not shown) within the exposure control electronics module 88. When energized, the flash 122 illuminates the scene and subjects included therein with both visible and infrared light.

The camera 10 additionally includes an empirically derived look-up table 130. The primary purpose of the look-up table 130 is to control the amount of image-carrying scene light rays focused on the film plane 16 by the lens 12 through the effective or taking aperture in the blade mechanism 18 formed by the primary apertures 22A and 22B, as a function of ambient scene light and of subject reflectivity.

As previously explained, the amount of artificial and ambient scene light transmitted to the film plane 16 is indirectly measured by sensing a portion of the artificial and ambient or visible scene light through the openings 30 and 32 in the blade mechanism 18 with photosensors 34 and 38 and their associated integrators located within the infrared light sensor 36 and the visible light sensor 40, respectively. A signal generated by the infrared sensor 36 and its associated integrator representative of reflected infrared scene light is routed to the look-up table 130 through a path 132 and a signal generated by the visible light sensor 40 and its associated integrator representative of ambient scene light is routed to the look-up table 130 through a path 134. The look-up table 130 generates a plurality of different signals in response to these two signals for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 130 are (1) an aperture size signal that controls the size of the taking aperture formed by the primary apertures 22A and 22B at which the flash tube 122 is fired, on an output path 136; (2) a percentage of artificial light signal that controls the amount of artificial light to be added to the scene to be photographed by the flash tube 122, on an output path 138; (3) a percentage of ambient light signal that controls the amount of image-carrying light to be admitted to the film plane 16 through the primary apertures 22A and 22B in the blade mechanism 18, on an output path 140; and (4) a signal to terminate the exposure interval at a time dependent upon the magnitude of the artificial and ambient light signals appearing on the input paths 132 and 134, respectively, to the look-up table 130, if the exposure interval is not sooner terminated, on an output path 142.

Prior to the generation of the above-noted look-up table output signals on the paths 136, 138, 140 and 142, the ambient light signal generated by the visible light sensor 40 is routed to the microcontroller 90, through the look-up table 130 and a path 144, for temporary storage. Subsequent to the storage of this ambient light signal in the microcontroller 90 and prior to the start of an exposure interval, the artificial light reflected from a scene subject previously illuminated by a wink or short duration flash of light from the flash tube 122 is sensed by the infrared sensor 36 and a signal representative thereof is routed to the look-up table 130 through the path 132. The ambient light signal stored within the microcontroller 90 is then routed to the look-up table 130 through a path 145. The stored ambient light signal and this infrared signal generated by the sensor 36 are collectively employed within the look-up table 130 to generate the above-noted signals appearing on the output paths 136, 138, 140 and 142 of the look-up table 130.

The signals appearing at the output paths 136, 138, 140 and 142 of the look-up table 130 in response to the artificial and ambient scene light signals respectively generated by the sensors 36 and 40 are empirically determined. The look-up table 130 is constructed in accordance with the subjective analysis of a multiplicity of photographic images of subjects at various distances having a range of reflectivities that are formed under a wide range of artificial and ambient scene lighting conditions, in order to produce these signals.

In general, when forming a photographic image at the film plane 16 of the camera 10, the smaller the taking aperture formed by the primary apertures 22A and 22B, the greater will be the depth of field of the lens 12 and the darker will be the ambient scene exposure level because of the reduction in image-carrying scene light caused by the smaller taking aperture. The look-up table 130 is constructed such that it performs a tradeoff between the sharpness of a subject within the scene and the overall scene exposure. In performing this tradeoff, the look-up table 130 causes the flash tube 122 to fire at the smallest possible taking aperture, and therefore the greatest depth of field, that will provide the optimum sharpness of a subject within a scene and overall scene exposure. The look-up table 130 further improves the overall scene exposure in response to the artificial and ambient scene light level signals generated by the sensors 36 and 40 by controlling the amount of artificial light generated by the scene-illuminating flash tube 122 and by controlling the maximum size of the taking aperture formed by the primary apertures 22A and 22B.

As noted above, the camera 10 is of the SLR type and therefore includes a conventional reflex mirror 146 that is actuatable by the exposure control electronics module 88 through a path 148. The mirror 146 is actuatable, in a conventional manner, between a viewing position where it blocks the transmission of scene light to the film plane 16 and where a camera operator can view a scene to be photographed through the lens 12, and a taking or unblocking position as shown in FIG. 1, where it reflects the scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a lighttight film cassette 150 shown in the condition assumed just after the cassette 150 has been fully inserted into the camera 10. The cassette 150 may enclose the 6 VDC battery 100.

Mounted within the camera 10 is a film advancing apparatus 152 similar to that described in U.S. Pat. No. 3,753,392 to Land that includes a motor for operating a gear train (neither shown) which is coupled with the film advancing apparatus 152 to provide for the continuous movement of an exposed film unit from an exposure position within the camera 10 toward the exterior thereof. The film advancing apparatus 152 additionally includes a film-engaging arm member (not shown) driven by the above-mentioned motor and gear train. The arm member is adapted to extend into a slot in the cassette 150, as shown in the above-noted Land '392 patent, and engage the uppermost film unit located therein at or near its trailing edge prior to moving it out of the cassette 150 and into the bite of a pair of conventional processing rollers (not shown) mounted adjacent the leading edge of the above-mentioned uppermost film unit. The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container of processing liquid at the leading end of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. For the purpose of this description it is assumed that the taking aperture of the blade mechanism 18 is in its full open position, that the openings 30 and 32 formed by the secondary apertures in the blade mechanism 18 are also fully opened, that the mirror 146 is in its viewing or light blocking position, that the flash apparatus 116 has been energized by the prior closure of a switch 154 that coupled the battery 100 to the DC-DC voltage converter 120 through the exposure control electronics module 88 and a path 156 and that the main storage capacitor 118 is fully charged and is ready for the initiation of an exposure cycle. With reference to FIGS. 1, 2A, 2B, 3A, 3B, 4 and 5 of the drawings, a switch 158 is actuated to its closed position by a camera operator to initiate the exposure cycle. The closure of the switch 158 couples the battery 100 to the exposure control electronics module 88 through a path 160. With the blade mechanism opening 32 formed by the secondary apertures 28A and 28B adjacent the visible light sensor 40 in its fully open position, the exposure control electronics module 88 and the microcontroller 90 coupled thereto through a path 162 causes the visible light sensor 40 through a path 164 to integrate ambient scene light for a fixed period of time and then send the integrated value to the look-up table 130 through the path 134 and then to the microcontroller 90 through the path 144 for temporary storage.

The exposure control electronics module 88 then energizes the shutter drive 24 to actuate the blade mechanism 18 and therefore the taking aperture together with the opening 30 formed by the secondary apertures 26A and 26B and the opening 32 formed by the secondary apertures 28A and 28B to their fully closed positions. As explained above, the control system within the shutter drive 24, in response to signals from the microcontroller 90 and the blade position sensor/encoder 42 through the exposure control electronics module 88, gradually reduces the amount of force being applied to the shutter blade elements 20A and 20B by the plunger 54 of the shutter mechanism actuating solenoid 56 to thereby minimize the amount of mechanical noise generated when the shutter mechanism 18 is actuated to its fully closed position. Subsequent to closing the opening 30 and prior to the initiation of an exposure interval, the shutter drive 24 causes the opening 30 to increase in size toward its fully opened position. While the opening 30 is being actuated toward its fully opened position, the exposure control electronics module 88 actuates means (not shown) for moving the mirror 146 from its viewing or light blocking position, where it precludes the transmission of image-carrying light rays to the film plane 16, to its light unblocking position (as shown in FIG. 1), where it facilitates the transmission of image-carrying light rays to the film plane 16 during an exposure interval. When the opening 30 adjacent the infrared light sensor 36 is in its fully opened position, the exposure control electronics module 88 triggers the flash tube 122 through the path 126 and thereby illuminates the scene to be photographed with visible and infrared light prior to the initiation of an exposure interval. The exposure control electronics module 88 then triggers the thyristor 124 through the path 128 thirty-five microseconds after triggering the flash tube 122 to thereby extinguish the light output of the flash tube 122. This thirty-five microsecond actuation of the flash tube 122 to illuminate the scene constitutes a first pulse of light directed toward the scene to be photographed.

In addition to the thirty-five microsecond actuation of the flash tube 122 to illuminate the scene prior to the initiations of an exposure interval, the exposure control electronics module 88 enables the integrator within the infrared sensor 36 through a path 166 during this same period of time and then causes the integrated value, which constitutes a measure of subject reflectivity, to be sent to the look-up table 130 through the path 132. Upon receipt of this subject reflectivity signal, the look-up table 130 combines it with the ambient light or scene brightness signal previously stored in the microcontroller 90. These combined signals are then employed to generate the aperture size flash fire signal, the percentage of artificial light signal, the percentage of ambient light signal and the end of exposure signal subsequently appearing on the look-up table output paths 136, 138, 140 and 142, respectively, that are, in turn, applied to the exposure control electronics module 88. Upon receipt of these look-up table generated signals, the exposure control electronics module 88 activates the shutter drive 24 and the blade mechanism 18 coupled thereto such that the opening 30 formed by the secondary apertures 26A and 26B is placed in its fully closed position and further activates the shutter drive 24 and the blade mechanism 18 to initiate an exposure interval.

The exposure control electronics module 88 includes four conventional comparators (not shown) to determine when the four conditions represented by the look-up table output signals on the paths 136, 138, 140 and 142 and employed in the generation of an exposure interval have been achieved. An exposure interval is defined herein as the period of time that the shutter mechanism 18 allows image-carrying light rays collected by the lens 12 to reach the film plane 16.

The first of the above-mentioned comparators compares the reference or desired aperture size flash fire signal on look-up table output path 136 with the actual blade position signal and therefore the taking aperture size as represented by the pulses 52 from the blade position sensor/encoder 42. When this first comparator determines that these two signals are equal, the exposure control electronics module 88 once again triggers the flash tube 122 through the path 126 and thereby illuminates the scene being photographed with light containing both visible and infrared light during the exposure interval.

The second of the above-mentioned comparators compares the reference or desired percentage of artificial light signal on look-up table output path 138 with the actual level of artificial light illuminating the scene as sensed by the infrared light sensor 36 during the exposure interval and routed to the exposure control electronics module 88 through the path 166. When this second comparator determines that these two signals are equal, the exposure control electronics module 88 triggers the thyristor 124 through the path 128 to thereby extinguish the artificial light being generated by the flash tube 122. This illumination of the scene with artificial light constitutes a second pulse of light that is directed toward the scene to be photographed.

The third of the above-mentioned comparators compares the reference or desired percentage of visible light signal on look-up table output path 138 with the actual level of visible light illuminating the scene as sensed by the visible light sensor 40 and routed to the exposure control electronics module 88 through the path 164. When the third comparator determines that these two signals are equal, the exposure control electronics module 88 actuates the shutter drive 24 to close the taking aperture in the blade mechanism 18 and thereby terminate the exposure interval.

Under certain scene lighting and subject reflectivity conditions there may be insufficient ambient and/or artificial scene light reflected from the scene for sensor 36 and/or the visible light sensor 40 to generate a signal that is capable of causing the exposure control electronics module 88 to terminate an exposure interval in a reasonable amount of time. A fourth comparator arrangement is provided to overcome this problem. This fourth comparator compares a signal on the look-up table output path 142 representative of the level of ambient and/or scene light reflected from the scene with a predetermined reference signal stored within the exposure control electronics module 88. If the signal on path 142 is greater than the reference signal, the exposure interval will be limited to a relatively short period of time such as 40 milliseconds and if it is less than the reference signal, the exposure interval will be limited to a relatively long period of time such as 400 milliseconds unless terminated sooner by the presence of greater levels of ambient and/or artificial scene light.

At the completion of the exposure interval, the exposure control electronics module 88 actuates the mirror 146 towards its light-blocking position, and actuates the film advancing apparatus 152 and the drive motor (not shown) included therein, through a path 168, to initiate the transport and processing of an exposed, self-developing film unit. The film advancing apparatus 152, in turn, moves the exposed film unit located in the cassette 150, through a path 170, into the bite of the pair of adjacent processing rollers (not shown), in the manner described above, to spread processing liquid between certain film layers and to move the exposed film unit into an exit slot (not shown) in a housing 172 of the self-developing camera 10. After the mirror 146 has been actuated to its light blocking position where it precludes the passage of light to the film plane 16, the exposure control electronics module 88 actuates the shutter drive 24 and the shutter mechanism 18 coupled thereto such that the primary or taking aperture thereof is placed in its fully opened position. After the film advancing apparatus 152 has moved the exposed film unit through the above-mentioned pair of rollers, a film movement completion signal is routed to the exposure control electronics module 88 and the microcontroller 90 coupled thereto through a path 174. Upon receipt of this film movement completion signal, the exposure control electronics module 88 initiates the charging of the electronic flash apparatus 116 through the path 156. When the main storage capacitor 118 of the electronic flash apparatus 116 is fully charged, as sensed through the path 156, the exposure control electronic module 88 places the exposure control system of the camera 10 in condition for the initiation of the next exposure cycle.

In the exposure control system described above, a source of artificial light generated by the flash tube 122 was employed to illuminate the scene with both visible and infrared light. The flash tube 122 illuminates the scene twice during an exposure cycle, once before and once during an exposure interval. Both the visible and infrared light were employed for exposure control during an exposure interval. However, only the infrared light from the flash tube 122 was employed for exposure control immediately prior to or at the early stages of the exposure interval. By firing the flash tube 122 twice and utilizing the infrared light portion of the illumination generated thereby in the determination of subject reflectivity before an exposure interval, only a single source of illumination is required. It should be noted, however, that exposure interval and pre-exposure interval illumination could be provided with two separate light sources. Once source would be that provided by the flash tube 122 to generate both visible and infrared light and would be employed during the exposure interval. The other source would only have to emit infrared light prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed is:

1. A control system for a shutter blade mechanism comprising:
 a shutter blade mechanism having means for forming an aperture for the passage of light therethrough, said shutter blade mechanism being actuatable between a first state where it admits light through said aperture and a second state where it precludes the passage of light through said aperture;
 a solenoid including an electrical coil and a plunger that is connected to said shutter blade mechanism, said plunger being movable from a first position where said shutter blade mechanism is in said first state to a second position where said shutter blade mechanism is in said second state when said electrical coil is energized;

means for sensing the degree of plunger movement and for generating a signal representative thereof;

means for connecting said electrical coil to a source of power; and means coupled to said electrical coil connecting means and responsive to said plunger movement signal for reducing the amount of power supplied to said electrical coil as said plunger is moved from its said first to its said second position and the shutter blade mechanism connected thereto is actuated from its said first to its said second state.

2. The control system of claim 1 wherein said means for reducing the amount of power supplied to said electrical coil includes a microcontroller that generates a series of variable width pulses whose width varies in response to said solenoid plunger movement signal and said means for connecting said electrical coil to a source of power is actuatable between a first condition wherein a maximum amount of power is supplied to said electrical coil and a second condition wherein a minimum amount of power is supplied to said electrical coil in response to said series of variable width pulses.

3. The control system of claim 2 wherein said minimum amount of power connected to said electrical coil when said power connecting means is in its said second condition is equal to zero.

4. An exposure control system for use in a single lens reflex camera for controlling the transmission of image forming light rays along an optical path from a scene to photosensitive material located in a film plane within the single lens reflex camera, said system comprising:

a blade mechanism comprising a pair of overlapping shutter blade elements with each shutter blade element having an aperture therein that cooperatively define an exposure aperture, said blade mechanism being mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane through said exposure aperture when said blade mechanism is actuated between its said light blocking and unblocking arrangements to produce an exposure interval;

encoder means for sensing the relative position of said shutter blade elements with respect to one another and for generating a signal representative thereof;

a solenoid including an electrical coil and a plunger that is movable from a first position to a second position when said electrical coil is coupled to a source of power;

means for coupling each of said shutter blade elements to said solenoid plunger;

means for connecting said electrical coil to a source of power; and means coupled to said coil connecting means and responsive to said shutter blade element relative position signal for reducing the amount of power supplied to said electrical coil as said solenoid plunger is actuated from its said first to its said second position as said blade mechanism, coupled thereto, is activated from its said light unblocking to its said light blocking arrangement prior to the actuation of said blade mechanism to produce said exposure interval.

5. The exposure control system of claim 4 wherein said shutter blade elements are mounted for displacement in opposite directions with respect to one another and said encoder means includes a generally linear array of blade position apertures in each of said shutter blade elements in an opposed relation, and a light emitting device and a light sensitive device positioned on opposite sides of said shutter blade elements such that relative displacement of said shutter blade elements alternately blocks and unblocks the transmission of light between said light emitting and said light sensitive devices to generate one or more pulses constituting said signal representative of the relative positive of said shutter blade elements.

6. A single lens reflex camera comprising:

means for defining a film plane;

an optical system for directing image-carrying light rays along an optical path from a scene onto photosensitive material located in said film plane;

a blade mechanism mounted for movement between a blocking arrangement in which said blade mechanism is in light blocking relation with respect to the optical path so as to preclude scene light from being transmitted along the optical path to said film plane and an unblocking arrangement in which said blade mechanism is in light unblocking relation with respect to the optical path so as to allow the passage of scene light to said film plane through an exposure aperture, said blade mechanism including a pair of overlapping shutter blade elements with each said shutter blade element having an aperture therein that cooperatively define an exposure aperture when said blade mechanism is actuated between its said light blocking and unblocking arrangements to produce an exposure interval;

encoder means for sensing the relative position of said shutter blade elements with respect to one another and for generating a signal representative thereof;

a solenoid including an electrical coil and a plunger that is movable from a first position to a second position when said electrical coil is coupled to a source of power;

means for connecting each of said shutter blade elements to said solenoid plunger;

first means for coupling said electrical coil to a source of power; and second means coupled to said first means and responsive to said shutter blade element relative position signal for reducing the amount of power supplied to said electrical coil as said solenoid plunger is activated from its said first to its said second position as said blade mechanism, coupled thereto, is activated from its said light unblocking arrangement to its said light blocking arrangement prior to the actuation of said blade mechanism to produce the exposure interval.

7. A method of reducing the mechanical noise generated by a plunger-type solenoid actuated shutter blade mechanism comprising the steps of:

providing a shutter blade mechanism having means for forming an aperture for the passage of light therethrough, the mechanism being actuatable between a first state where it admits light through the aperture and a second state where it precludes passage of light through the aperture;

providing a solenoid having an electrical coil and a plunger that is connected to the shutter blade mechanism, said plunger being movable from a first position to a second position when the electrical coil is coupled to a source of power;

coupling the electrical coil to a source of power;

sensing the degree of solenoid plunger movement and generating a signal representative thereof; and reducing the amount of power to the electrical coil in response to the signal representative of the degree of solenoid plunger movement, as the solenoid plunger is actuated to move from its first to its second position.

8. The method of claim 7 wherein the step of sensing the degree of solenoid plunger movement and generating a signal representative thereof further includes the step of generating a series of pulses representative of solenoid plunger position, and the step of reducing the amount of power to the electrical coil includes the step of reducing the power to the electrical coil in response to these solenoid plunger position pulses.

* * * * *